(12) United States Patent
Liu et al.

(10) Patent No.: US 12,436,941 B2
(45) Date of Patent: Oct. 7, 2025

(54) DATA CONSISTENCY CONTROL METHOD APPLIED TO RAILWAY SIGNAL CENTRALIZED MONITORING SYSTEM

(71) Applicant: CASCO SIGNAL LTD., Shanghai (CN)

(72) Inventors: Xiaofeng Liu, Shanghai (CN); Xiangbo Yang, Shanghai (CN); Enhua Hu, Shanghai (CN); Pengfei Tu, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 0 days.

(21) Appl. No.: 18/720,604

(22) PCT Filed: Nov. 11, 2022

(86) PCT No.: PCT/CN2022/131333
§ 371 (c)(1),
(2) Date: Jun. 14, 2024

(87) PCT Pub. No.: WO2023/116251
PCT Pub. Date: Jun. 29, 2023

(65) Prior Publication Data
US 2025/0053558 A1 Feb. 13, 2025

(30) Foreign Application Priority Data
Dec. 22, 2021 (CN) .......................... 202111581012.4

(51) Int. Cl.
*G06F 16/23* (2019.01)
*G06F 16/27* (2019.01)
*H04L 9/06* (2006.01)

(52) U.S. Cl.
CPC ........ *G06F 16/2365* (2019.01); *G06F 16/275* (2019.01); *H04L 9/0643* (2013.01); *H04L 2209/34* (2013.01)

(58) Field of Classification Search
CPC .... G06F 16/2365; G06F 16/275; G06F 16/27; H04L 9/0643; H04L 2209/34
See application file for complete search history.

(56) References Cited

U.S. PATENT DOCUMENTS

| 10,977,222 B1 | 4/2021 | Esman | |
| 2021/0114616 A1* | 4/2021 | Altman | H04W 76/15 |
| 2022/0271854 A1* | 8/2022 | Maruyama | H04L 67/125 |

FOREIGN PATENT DOCUMENTS

| CN | 101917237 A | 12/2010 |
| CN | 103029722 A | 4/2013 |

(Continued)

*Primary Examiner* — Apu M Mofiz
*Assistant Examiner* — Cindy Nguyen
(74) *Attorney, Agent, or Firm* — Bayramoglu Law Offices LLC

(57) ABSTRACT

A data consistency control method, applied to a centralized railway signal monitoring system, includes: acquiring, by a center of the centralized railway signal monitoring system, all data in a local and target time intervals; encoding, by the center, all the acquired data according to a type of the data to generate a first data consistency identifier; sending, by the center, a data consistency detection command to a station, and inquiring, by the station, all the data in the local and target time intervals upon receiving the command and encoding the data to generate a second data consistency identifier, and returning the second data consistency identifier to the center; and comparing, by the center, the first data consistency identifier with the second data consistency identifier, and finishing data consistency control in a case that the first data consistency identifier and the second data consistency identifier that are compared are consistent.

19 Claims, 3 Drawing Sheets

(56) References Cited

FOREIGN PATENT DOCUMENTS

| | | |
|---|---|---|
| CN | 104890702 A | 9/2015 |
| CN | 111177255 A | 5/2020 |
| CN | 113362207 A | 9/2021 |
| CN | 114253987 A | 3/2022 |

* cited by examiner

DATA CONSISTENCY CONTROL METHOD APPLIED TO RAILWAY SIGNAL CENTRALIZED MONITORING SYSTEM

CROSS-REFERENCE AND RELATED APPLICATION

This application is a National Stage of International Application No. PCT/CN2022/131333 filed on Nov. 11, 2022, which claims priority to Chinese Patent Application No. 202111581012.4 filed on Dec. 22, 2021. Both of the aforementioned applications are hereby incorporated by reference in their entireties.

TECHNICAL FIELD

The present disclosure relates to the technical field of data synchronization, and particularly relates to a data consistency control method applied to a centralized railway signal monitoring system.

BACKGROUND

A center/station distributed structure of a centralized railway signal monitoring system asks the center to review information of each station. Except for a small amount of data directly called at the center by a central layer of an early signal centralized monitoring system, a large amount of data is called directly from a remote station when being viewed. With the development of the signal centralized monitoring system, there are increasing requirements for cross-station and cross-system comprehensive viewing and comprehensive analysis. It is needed to gather main data of each station to the center for uniform storage and use. As a result of the autonomy of operations of the center and the station system, the station and the center are not used online simultaneously, which results in data inconsistency of the center and the station. In addition, in a case that a field network is unstable, data of the station cannot be completely sent up to the center. Data inconsistency between the center and the station will severely lower the reliability of the system, which affects the overall availability of the system.

SUMMARY

The present disclosure aims to at least solve one of the technical problems in the related art to a certain extent. Therefore, an object of the present disclosure is to provide a data consistency control method applied to a centralized railway signal monitoring system to improve the reliability and the overall availability of the centralized railway signal monitoring system.

In order to achieve the above objective, the present disclosure is implemented by the following technical solution:

A data consistency control method applied to a centralized railway signal monitoring system includes: acquiring, by a center of the centralized railway signal monitoring system, all data in local and target time intervals; encoding, by the center, all the acquired data according to a type of the data to generate a first data consistency identifier; sending, by the center, a data consistency detection command to a station, and inquiring, by the station, all data in the local and target time intervals upon receiving the command and encoding the data to generate a second data consistency identifier, and returning the second data consistency identifier to the center; and comparing, by the center, the first data consistency identifier with the second data consistency identifier, and finishing data consistency control in a case that the first data consistency identifier and the second data consistency identifier that are compared are consistent.

In one embodiment, the type of the data includes at least one of continuous acquisition data, discrete acquisition data, alarm data, statistical data, and report data.

In one embodiment, the mode of encoding, by the center, all the acquired data according to a type of the data includes: a single data consistency identifier encoding mode and an overall data consistency identifier encoding mode taking the time interval as a unit, wherein the single data consistency identifier encoding mode is an encoding mode based on a key field of the data, and the key field comprises a unique identifier field and an index information field.

In one embodiment, the single data consistency identifier has a bidirectional conversion feature, and the key field can be acquired by decoding the single data consistency identifier.

In one embodiment, in a case that different types of data are encoded by the single data consistency identifier encoding mode, the applied key fields are different.

In one embodiment, the overall data consistency identifier encoding mode is a two-stage encoding mode, and for a same type of data, the two-stage encoding mode includes: selecting the single data consistency identifier of all data or part of data in the target time interval to generate an MD5 code with a fixed length; and acquiring data time interval information, data type, and data quantity of data to be encoded, and combinatorially encoding the data time interval information, the data type and the data quantity, and the MD5 code to generate the overall data consistency identifier in the target time interval.

In one embodiment, in a case that a data volume of the data to be encoded is greater than a first preset value, the single data consistency identifier of the part of data in the target time interval is selected to generate the MD5 code with the fixed length; and in a case that the data volume of the data to be encoded is less than a second preset value or an important grade of the data to be encoded is greater than a preset grade, the single data consistency identifier of all data in the target time interval is selected to generate the MD5 code with the fixed length.

In one embodiment, the first data consistency identifier and the second data consistency identifier both are the overall data consistency identifiers in the target time interval.

In one embodiment, in a case that the center encodes all the acquired data according to the type of the data, a third data consistency identifier is further generated, and the third data consistency identifier is the single data consistency identifier of all the acquired data in the target time interval.

In one embodiment, in a case that the center compares the first data consistency identifier with the second data consistency identifier, and the first data consistency identifier and the second data consistency identifier that are compared are inconsistent, the method further includes: sending, by the center, a fourth data consistency identifier request command to the station to acquire the fourth data consistency identifier, the fourth data consistency identifier being the single data consistency identifier generated by encoding all data in the local and target time intervals of the station by the station; comparing, by the center, the third data consistency identifier with the fourth data consistency identifier to acquire a fifth data consistency identifier, the fifth data consistency identifier being a data consistency identifier in a case that a difference exists between the third data consistency identifier and the fourth data consistency identifier; and sending, by the center, a data synchronization operation to the station according to the fifth data consistency identifier.

In one embodiment, the operation of sending, by the center, a data synchronization operation to the station according to the fifth data consistency identifier includes: sending, by the center, the fifth data consistency identifier to the station; decoding, by the station, the fifth data consistency identifier to acquire the key field of the data, and locally calling corresponding difference data from the station according to the key field of the data; and locally storing, by the center, the difference data, returning to the operation of acquiring all data in the local and target time intervals, and performing data consistency detection again till consistent data comparison.

In one embodiment, the method further includes: acquiring service features of various types of data, and establishing a data calling mechanism between the center and the station according to the service features, where during data calling, the corresponding data calling mechanism is determined according to the service features of the data, and the data calling mechanism comprises a data subscription/dissemination mechanism and a data retrieval mechanism.

In one embodiment, the data subscription/dissemination mechanism includes: sending, by the center, a subscription command to the station, and uploading, by the station, data meeting the subscription command to the center upon receiving the subscription command during data processing; and the data retrieval mechanism includes: sending, by the center, a retrieval command, to the station, and locally inquiring and uploading, by the station, data meeting the retrieval command to the center directly upon receiving the retrieval command.

In one embodiment, in a case that the type of data called by the center is the continuous acquisition data, the discrete acquisition data, and the alarm data, the data subscription/dissemination mechanism is used; and in a case that the type of data called by the center is the statistical data and the report data, the data retrieval mechanism is used.

In one embodiment, in a case that the type of data called by the center is the continuous acquisition data and the discrete acquisition data, the subscription command includes a data type and station identifier information; in a case that the type of data called by the center is the alarm data, the subscription command includes an alarm data type, an alarm equipment type, and station identifier information; and in a case that the type of data called by the center is the statistical data and the report data, the retrieval command includes a time interval and data type information.

In one embodiment, in a case that the station does not receive the subscription command in preset time, the station stops sending data to the center.

In one embodiment, a data consistency automatic detection and synchronization operation is performed at every preset period.

In one embodiment, a data consistency comparative detection and synchronization operation is performed in batches according to the type of data.

In one embodiment, the target time interval information is recorded and stored after the data consistency comparative detection and synchronization operation is performed on all data in the target time interval.

The present disclosure has the following beneficial effects:
1. The present disclosure is capable of automatically guaranteeing the data consistency among distributed nodes of the centralized railway signal monitoring system, so as to improve the reliability and the overall availability of the system.
2. In the present disclosure, the encoding rule of the two data consistency identifiers of the data features of the centralized railway signal monitoring system are determined, and corresponding data consistency identifiers respectively include the single data consistency identifier and the overall data consistency identifier. Through the optimized two-stage data identifier detection and difference data synchronization method, on the premise of not significantly increasing the quantity of data interaction and the network transmission overhead, the target of data consistency control of the center and the station is achieved.
3. In the present disclosure, the data subscription/dissemination mechanisms of the center and the station for the data service features of the centralized railway signal monitoring system are determined. The method is of better flexibility, so that the granularity of data interaction between the center and the station can be controlled conveniently, and therefore, redundant data transmission is reduced.

DETAILED DESCRIPTION

Further description of the present disclosure in detail will be made below in combination with drawings and specific embodiments. The advantages and features of the present disclosure are clearer according to the description and claims below. It is to be noted that the drawings in a quite simplified form with an inaccurate ratio are merely used for describing objectives of the embodiments of the present disclosure in an assistant manner conveniently and clearly.

The data consistency control method applied to a centralized railway signal monitoring system in the embodiment is described below with reference to the drawings.

Figure 1:
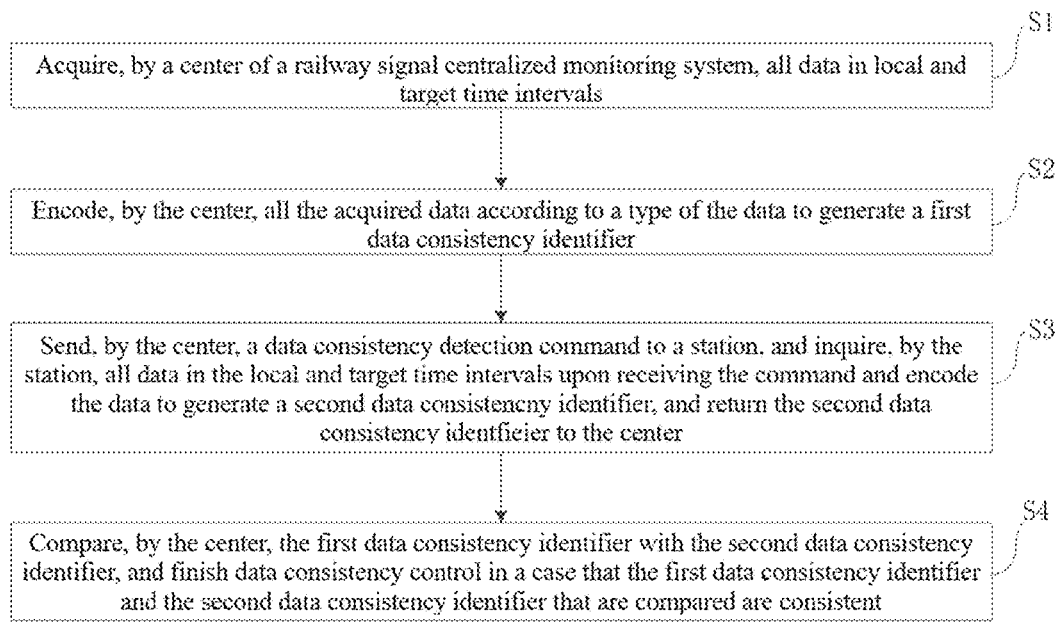
FIG. 1 is a flowchart of a data consistency control method applied to a centralized railway signal monitoring system according to an embodiment of the present disclosure.

FIG. 1 is a flowchart of a data consistency control method applied to a centralized railway signal monitoring system provided in an embodiment of the present disclosure. As shown in FIG. 1, the method includes:

S1: a center of the centralized railway signal monitoring system acquires all data in local and target time intervals.

The type of the data includes at least one of continuous acquisition data, discrete acquisition data, alarm data, statistical data, and report data.

Specifically, the centralized railway signal monitoring system is of a distributed structure. One center administrates all stations on one or more lines. The center needs to gather main data of the administrated stations, including the continuous acquisition data, the discrete acquisition data, the alarm data generated by autonomous analysis, the statistical data, and the report data. Therefore, in a case that data consistency detection is needed, the center may set a target time interval and acquire all data in the target time interval locally from the center for comparative detection. All the acquired data may include, but is not limited to, the above type of the data.

S2: the center encodes all the acquired data according to a type of data to generate a first data consistency identifier.

The mode of encoding, by the center, all the acquired data according to a type of the data includes: a single data consistency identifier encoding mode and an overall data consistency identifier encoding mode taking the time interval as a unit, where the single data consistency identifier encoding mode is an encoding mode based on a key field of the data, and the key field comprises a unique identifier field and an index information field.

In an embodiment of the present disclosure, the single data consistency identifier has a bidirectional conversion feature, and the key field can be acquired by decoding the single data consistency identifier.

Specifically, the encoding rule of the data consistency identifier may be designed according to the features of various types of data of the centralized railway signal monitoring system. The encoding rule may specifically include the encoding rule of the single data consistency identifier and the encoding rule of the overall data consistency identifier taking the time interval as a unit. The single data consistency identifier is generated by encoding the data-based unique identifier field and the index information field. The encoding rule supports bidirectional conversion, that is, may decode to obtain the unique identifier field and the index information field according to the generated single data consistency identifier. The unique identifier field may include, but is not limited to, a universal unique identifier (UUID), and the index information field may include, but is not limited to, a data resource identifier code.

It is to be noted that in a case that different types of data are encoded by the single data consistency identifier encoding mode, the applied key fields are different.

Figure 2:
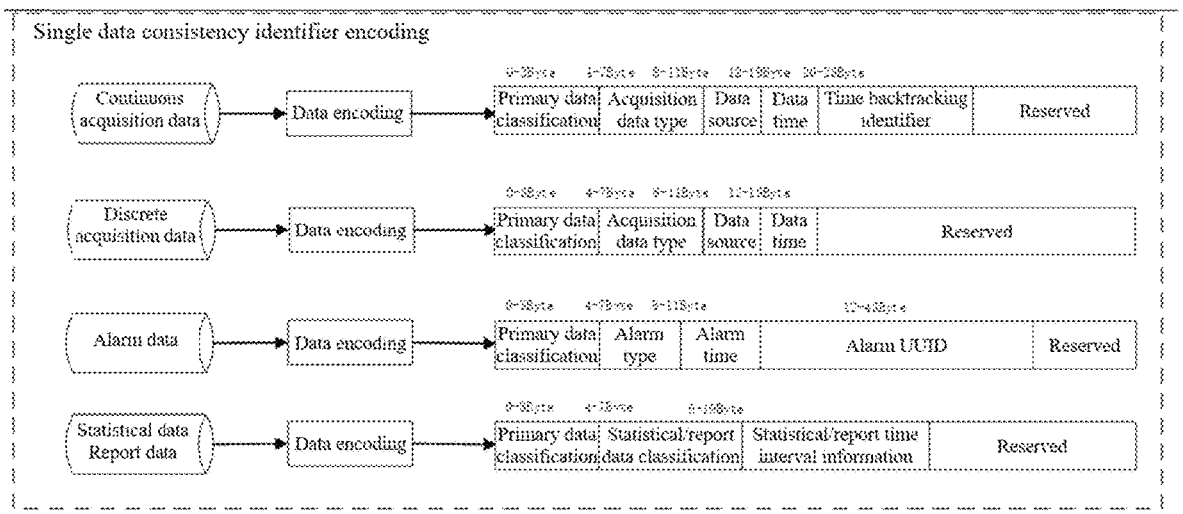
FIG. 2 is an encoding schematic diagram of a single data consistency identifier according to an embodiment of the present disclosure.

As shown in FIG. 2, the continuous acquisition data includes data such as a switching value and an analog quantity. The key field needed or applied by the single data consistency identifier includes: a data type code, a data source identifier code, a data timestamp, and a data time backtracking identifier. The data time backtracking identifier is an identifier used to differentiate repeated time interval data in case of a time hop, and moreover, the data type code, the data source identifier code, the data timestamp, and the data time backtracking identifier may be decoded and acquired according to the single data consistency identifier. For the discrete acquisition data, the key field needed to encode the single data consistency identifier includes: a data type code, a data source identifier code, and a data timestamp, and moreover, the data type code, the data source identifier code, and the data timestamp may be decoded and acquired according to the single data consistency identifier; for the alarm data, the key field needed to encode the single data consistency identifier includes: an alarm UUID, alarm time, and an alarm type code, and moreover, the alarm UUID, the alarm time, and the alarm type code may be decoded and acquired according to the single data consistency identifier; for the statistical data, the key field needed to encode the single data consistency identifier includes: a statistical data type and statistical time interval information, and moreover, the statistical data type and the statistical time interval information may be decoded and acquired according to the single data consistency identifier; and for the report data, the key field needed to encode the single data consistency identifier includes: a report data type and report time interval information, and moreover, the report data type and the report time interval information may be decoded and acquired according to the single data consistency identifier.

Therefore, the single data consistency identifier may be coded based on the corresponding key field according to the type of the data, so as to acquire the corresponding single data consistency identifier.

In an embodiment of the present disclosure, the overall data consistency identifier encoding mode is a two-stage encoding mode, and for a same type of data, the two-stage encoding mode includes: the single data consistency identifier of all data or part of data in the target time interval is selected to generate a Message-Digest Algorithm (MD5) code with a fixed length; and data time interval information, data type, and data quantity of data to be encoded are acquired, and the data time interval information, the data type and the data quantity, and the MD5 code are combinatorially encoded to generate the overall data consistency identifier in the target time interval.

In a case that a data volume of the data to be encoded is greater than a first preset value, the single data consistency identifier of the part of data in the target time interval is selected to generate the MD5 code with the fixed length; and in a case that the data volume of the data to be encoded is less than a second preset value or an important grade of the data to be encoded is greater than a preset grade, the single data consistency identifier of all data in the target time interval is selected to generate the MD5 code with the fixed length.

Specifically, the overall data consistency identifier encoding mode in the embodiment is the two-stage encoding mode, that is, the single data consistency identifier of all or part of data in the target time interval is acquired first, and then overall data consistency identifier in the target time interval is generated through the single data consistency identifier.

In a case that the overall data consistency identifier is encoded, all or part of data in the target time interval may be encoded according to the type of the data.

Figure 3:
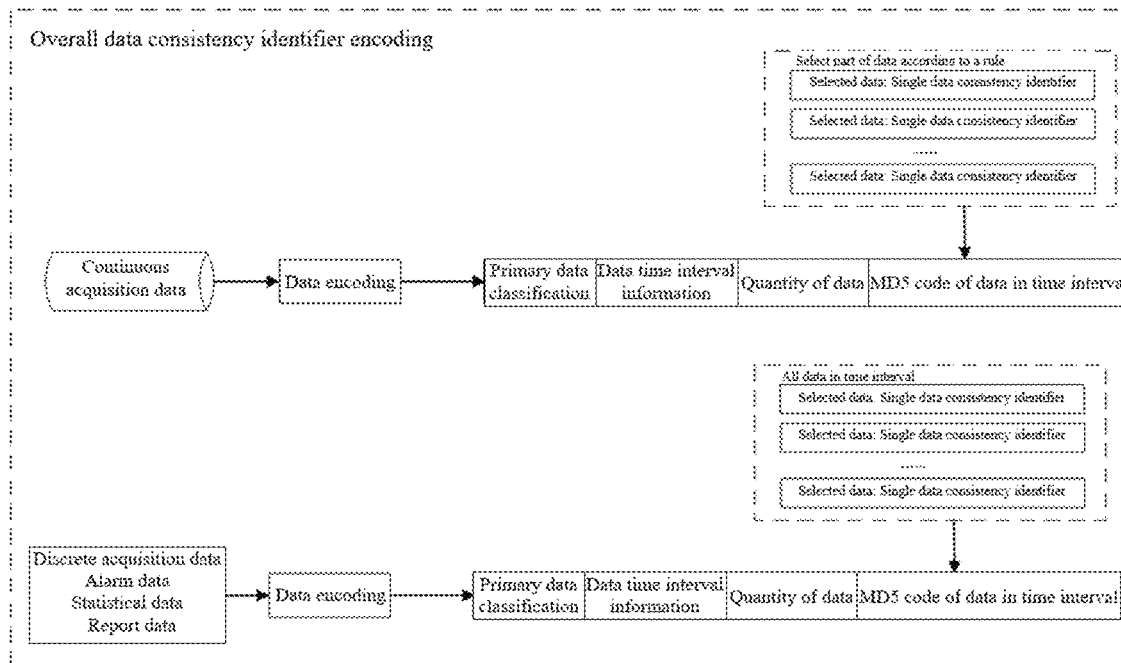
FIG. 3 is an encoding schematic diagram of an overall data consistency identifier according to an embodiment of the present disclosure.

As an example, as shown in FIG. 3, for the continuous acquisition data, thanks to a large data volume, in consideration of performance factors, the single data consistency identifier of part of data in the target time interval may be selected according to a fixed rule to generate the MD5 code, and then the data time interval information, the data type (the continuous acquisition data), and the data quantity (the number of pieces of data) of the data and the MD5 code are combinatorially encoded to generate the overall data consistency identifier in the target time interval; for the alarm data, thanks to a high importance grade of data, the single data consistency identifier of all the data in the target time interval may be selected and are spliced to form an integral data pack to generate the MD5 code, so as to further generate the overall data consistency identifier; and for the discrete acquisition data, the statistical data, and the report data, thanks to a small amount of data, a policy of generating the MD5 code is consistent with that of the alarm data.

Therefore, the single data consistency identifier may be coded based on the corresponding key field according to the type of the data, so as to acquire the corresponding single data consistency identifier, and then all or part of data is selected according to the type of the data for two-stage encoding to generate the overall data consistency identifier.

S3: the center sends a data consistency detection command to a station, and the station inquires all data in the local and target time intervals upon receiving the command and encoding the data to generate a second data consistency identifier, and returns the second data consistency identifier to the center.

It is to be noted that the first data consistency identifier and the second data consistency identifier both are the overall data consistency identifiers in the target time interval. Moreover, in a case that the center encodes all the acquired data according to the type of the data, a third data consistency identifier is further generated, and the third data consistency identifier is the single data consistency identifier of all the acquired data in the target time interval.

It may be appreciated that in a case that the center generates the first data consistency identifier, the center correspondingly generates the single data consistency identifier, that is, the third data consistency identifier, of all the data first, so as to encode and generate the first data consistency identifier according to the third data consistency identifier.

S4: the center compares the first data consistency identifier with the second data consistency identifier, and finishes data consistency control in a case that the first data consistency identifier and the second data consistency identifier that are compared are consistent.

In the embodiment, the center may, taking the time interval as a unit, initiate the data consistency comparative detection operation between the center and the station according to the type of data.

Figure 4:
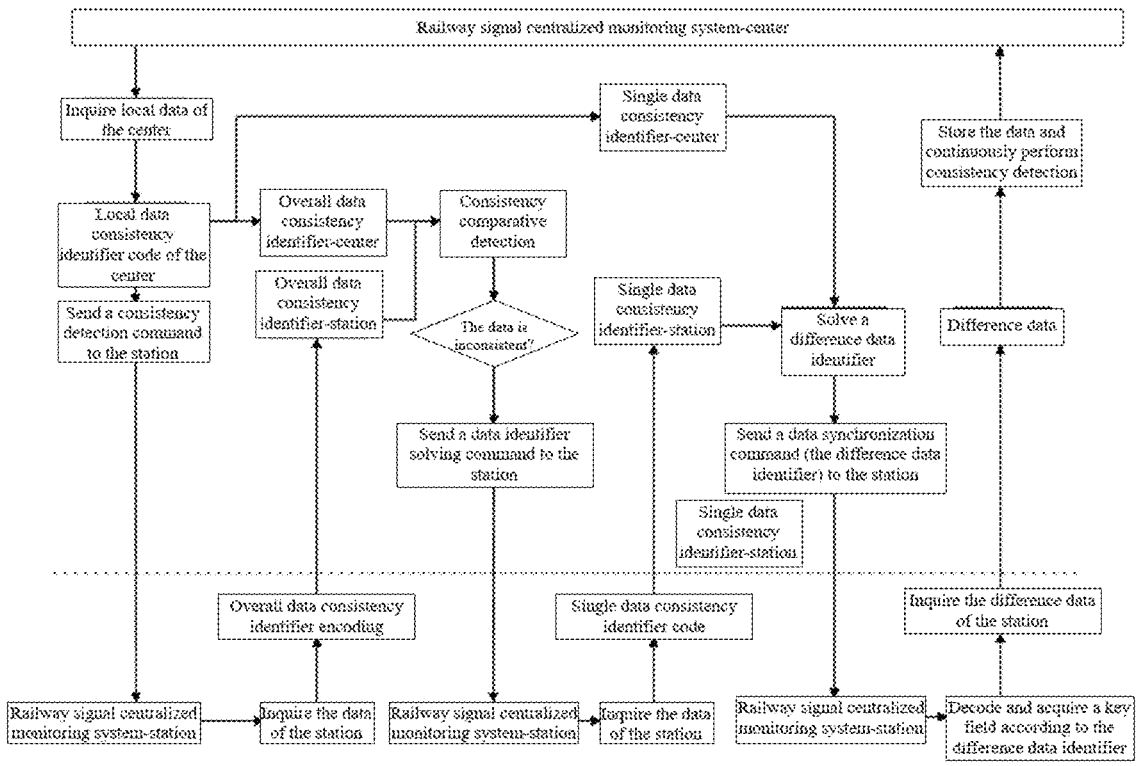
FIG. 4 is a working flowchart of a data consistency control method applied to a centralized railway signal monitoring system according to an embodiment of the present disclosure.

Specifically, as shown in FIG. 4, the center locally inquires the key field needed to encode the consistency identifier of all the data in the target time interval and generates the single data consistency identifier and the overall data consistency identifier according to the two-stage encoding rule, that is, respectively generates the third data consistency identifier and the first data consistency identifier. The center sends the data consistency detection command to the station. Upon receiving the command, the station inquires the key field needed to encode the consistency identifier of all the data in the target time interval, and generates the overall data consistency identifier according to the encoding rule, that is, the second data consistency identifier, and returns the second data consistency identifier to the center. Further, the center compares the local overall data consistency identifier and the overall data consistency identifier of the station to judge whether a difference exists between the data of the center and the station. If no difference exists, the data consistency comparative detection of the type of data to be detected in the target time interval is completed without a subsequent synchronous operation. If the difference exists, subsequent operations are performed.

It is to be noted that in the embodiment, a data consistency comparative detection and synchronization operation may be performed in batches according to the type of the data, which thus may guarantee that the processing time of different types of data is staggered, so that the smoothness of the software performance and the network load is guaranteed.

In an embodiment of the present disclosure, the center compares the first data consistency identifier with the second data consistency identifier. When the first data consistency identifier and the second data consistency identifier that are compared are inconsistent, the method further includes: the center sends a fourth data consistency identifier request command to the station to acquire the fourth data consistency identifier; the fourth data consistency identifier is the single data consistency identifier generated by the station to encode all the data in the local and target time intervals of the station; the center compares the third data consistency identifier with the fourth data consistency identifier to acquire the fifth data consistency identifier, and the fifth data consistency identifier is the data consistency identifier in a case that a difference exists between the third data consistency identifier and the fourth data consistency identifier; and the center initiates the data synchronization operation to the station according to the fifth data consistency.

Specifically, if in a case that the data difference exists in a case that the overall data consistency identifiers of the center and the station are compared, a data identifier of a difference portion is solved, and then the data synchronization operation of the center and the station is initiated according to the difference data identifier information, and the center calls the difference data from the station and performs data consistency detection again till the data of the center and the data of the station in the target time interval are consistent.

As an example, in a case that the two that are compared are inconsistent, the center sends a single data consistency identifier request command to the station, that is, the fourth data consistency identifier request command. Upon receiving the command, the station inquires the key field needed to encode the consistency identifier of all the data in the target time interval, and generates the single data consistency identifier of all the data according to the encoding rule, and returns the single data consistency identifier of all the data to the center.

The center compares the single data consistency identifier of the type of data to be detected locally cached, that is the third data consistency identifier, with the single data consistency identifier of the type of data to be detected sent by the station, that is the fourth data consistency identifier, so as to acquire the data consistency identifier of the difference portion, that is, the fifth data consistency identifier.

In an embodiment of the present disclosure, the operation of sending, by the center, a data synchronization operation to the station according to the fifth data consistency identifier includes: the center sends the fifth data consistency identifier to the station; the station decodes the fifth data consistency identifier to acquire the key field of the data, and locally calls corresponding difference data from the station according to the key field of the data; and the center locally stores the difference data, returns to the operation of acquiring all data in the local and target time intervals, and performs data consistency detection again till consistent data comparison.

Specifically, the center sends the synchronization operation command to the station. Upon receiving the command, the station decodes and acquires the corresponding key field information according to the data consistency identifier of the difference portion in the command, that is, the fifth data consistency identifier, calls the difference data from the station according to the key field information, and then sends the same to the center. Upon receiving and storing the difference data, the center continuously performs the consistency comparative detection and synchronization till the data is consistent.

In an embodiment of the present disclosure, the method further includes: service features of various types of data are acquired, and a data calling mechanism is established between the center and the station according to the service features, where during data calling, the corresponding data calling mechanism is determined according to the service features of the data, and the data calling mechanism includes a data subscription/dissemination mechanism and a data retrieval mechanism.

Specifically, the data subscription/dissemination mechanism and the data retrieval mechanism between the center and the station may be designed according to the service features of various data, so as to transfer the various data of the station to the center based on the mechanisms. Upon receiving the data sent by the station, the center stores the data as the local data of the center.

The service features may be real-time requirement grades of the data. As an example, in a case that the requirement for real time of the data is high, the data subscription/dissemination mechanism may be used. In a case that the requirement for real time of the data is low, the data retrieval mechanism may be used. Therefore, in a case that the type of data called by the center is the continuous acquisition data, the discrete acquisition data, and the alarm data, that is, the requirement for real time of the data is high, the data subscription/dissemination mechanism is used; and in a case that the type of the data called by the center is the statistical data and the report data, that is, the requirement for real time of the data is low, the data retrieval mechanism is used.

Figure 5:
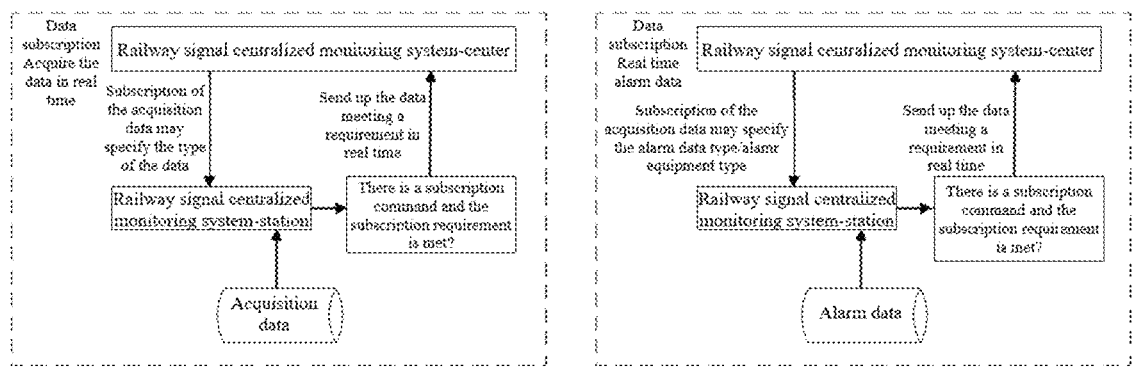
FIG. 5 is a working flowchart of data subscription mechanisms of a center and a station according to an embodiment of the present disclosure.

In an embodiment of the present disclosure, as shown in FIG. 5, the data subscription/dissemination mechanism includes: the center sends a subscription command to the station, and the station uploads data meeting the subscription command to the center upon receiving the subscription command during data processing; and the data retrieval mechanism includes: the center sends a retrieval command, to the station, and the station locally inquires and uploads data meeting the retrieval command to the center directly upon receiving the retrieval command.

In a case that the type of data called by the center is the continuous acquisition data and the discrete acquisition data, the subscription command includes a data type and station identifier information; in a case that the type of data called by the center is the alarm data, the subscription command includes an alarm data type, an alarm equipment type, and station identifier information; and in a case that the type of data called by the center is the statistical data and the report data, the retrieval command includes a time interval and data type information. It is to be noted that in a case that the station does not receive the subscription command in preset time, the station stops sending data to the center.

Specifically, for the continuous acquisition data and the discrete acquisition data, the center sends the subscription command to the station in a scheduled manner according to information such as the acquisition data type and the station identifier to be called, and in a case that the station processes the acquisition data subsequently upon receiving the subscription command, the station actively uploads the acquisition data meeting the requirement of the subscription command to the center. If the station has not received the acquisition data subscription command for a long time, the station stops sending up the acquisition data actively. For the alarm data, the center sends the subscription command to the station in a scheduled manner according to information such as the alarm data type, the alarm equipment type, and the station identifier to be called, and in a case that the station generates the alarm data subsequently upon receiving the subscription command, the station actively uploads the alarm data meeting the requirement of the subscription command to the center. If the station has not received the alarm subscription command for a long time, the station stops sending up the alarm data actively.

The data subscription/dissemination mechanisms in the embodiment are of better flexibility, so that the granularity of data interaction between the center and the station can be controlled conveniently, and therefore, redundant data transmission is reduced.

In an embodiment of the present disclosure, the data consistency automatic detection and synchronization operation is performed at every preset period, and the target time interval information is recorded and stored after the data consistency comparative detection and synchronization operation is performed on all data in the target time interval.

Specifically, the data consistency comparative detection and synchronization operation may be initiated at every period in a target time interval to guarantee that the data in each time interval can be detected and synchronized. Of course, after the data consistency comparative detection and synchronization operation in the target time interval is completed, the target time interval information may be recorded, so that the target time interval is prevented from being repeatedly operated after the system is rebooted.

To sum up, in the present disclosure, the two encoding rules for the data consistency identifier of the data features of the centralized railway signal monitoring system are determined. Through the optimized two-stage data identifier detection and difference data synchronization method, on the premise of not significantly increasing the quantity of data interactions and the transmission overhead of the network, the target of data consistency control of the center and the station is achieved, and the data consistency among the distributed nodes of the centralized railway signal monitoring system can be automatically guaranteed, so that the overall availability of the system is enhanced. Besides, the data subscription/dissemination mechanisms of the center and the station for the data service features of the centralized railway signal monitoring system are further determined with better flexibility, so that the granularity of data interaction between the center and the station can be controlled conveniently, and therefore, redundant data transmission is reduced.

Although the content of the present disclosure has been described in detail through the above preferred embodiments, it should be realized that the above description should not be considered as a limit to the present disclosure. Various modifications and alternatives to the present disclosure will become apparent to those skilled in the art upon reading the foregoing disclosure. Accordingly, the protection scope of the present disclosure shall be limited by the appended claims.

What is claimed is:

1. A data consistency control method, applied to a centralized railway signal monitoring system, comprising:
acquiring, by a center of the centralized railway signal monitoring system, all data in a target time interval locally;
encoding, by the center, all the acquired data according to one or more types of data to generate a first data consistency identifier;
wherein a mode of the encoding, by the center, all the acquired data according to the one or more types of the data comprises: a single data consistency identifier encoding mode and an overall data consistency identifier encoding mode taking the time interval as a unit, wherein the single data consistency identifier encoding mode is an encoding mode based on one or more key fields of the data, and each of the one or more key fields comprises a unique identifier field and an index information field; the overall data consistency identifier encoding mode is an encoding mode based on a single data consistency identifier;

sending, by the center to a station, a data consistency detection command;

inquiring, by the station, all the data in the target time interval locally upon receiving the data consistency detection command and encoding, by the station, the data to generate a second data consistency identifier, sending, by the station to the center, the second data consistency identifier;

comparing, by the center, the first data consistency identifier with the second data consistency identifier; and finishing a data consistency control in response to that the first data consistency identifier and the second data consistency identifier that are compared are consistent.

2. The data consistency control method according to claim 1, wherein the one or more types of the data comprises at least one of continuous acquisition data, discrete acquisition data, alarm data, statistical data, or report data.

3. The data consistency control method according to claim 1, wherein the single data consistency identifier has a bidirectional conversion feature, and the key field is acquired by decoding the single data consistency identifier.

4. The data consistency control method according to claim 3, wherein in response to that the one or more types of the data encoded by the single data consistency identifier encoding mode are different, the one or more key fields are different.

5. The data consistency control method according to claim 1, wherein the overall data consistency identifier encoding mode is a two-stage encoding mode, and for a same type of data, the two-stage encoding mode comprises:

selecting the single data consistency identifier of all the data or a part of the data in the target time interval to generate a Message-Digest Algorithm (MD5) code with a fixed length; and acquiring data time interval information, the one or more types of the data, and a data quantity of the data to be encoded, and combinatorially encoding the data time interval information, the one or more types of the data, the data quantity, and the MD5 code to generate the overall data consistency identifier in the target time interval.

6. The data consistency control method according to claim 5, wherein in response to that a data volume of the data to be encoded is greater than a first preset value, the single data consistency identifier of the part of the data in the target time interval is selected to generate the MD5 code with the fixed length; and in response to that the data volume of the data to be encoded is less than a second preset value or a grade of the data to be encoded is greater than a preset grade, the single data consistency identifier of all the data in the target time interval is selected to generate the MD5 code with the fixed length.

7. The data consistency control method according to claim 1, wherein the first data consistency identifier and the second data consistency identifier both are the overall data consistency identifiers in the target time interval.

8. The data consistency control method according to claim 1, wherein in response to that the center encodes all the acquired data according to the one or more types of the data, a third data consistency identifier is further generated, and the third data consistency identifier is the single data consistency identifier of all the data acquired by the center in the target time interval.

9. The data consistency control method according to claim 8, wherein in response to that the center compares the first data consistency identifier with the second data consistency identifier, and the first data consistency identifier and the second data consistency identifier that are compared are inconsistent, the method further comprising:

sending, by the center, a fourth data consistency identifier request command to the station to acquire the fourth data consistency identifier, the fourth data consistency identifier being the single data consistency identifier generated by encoding all the data in the target time interval locally by the station;

comparing, by the center, the third data consistency identifier with the fourth data consistency identifier to acquire a fifth data consistency identifier, the fifth data consistency identifier being a data consistency identifier in response to that a difference exists between the third data consistency identifier and the fourth data consistency identifier; and sending, by the center, a data synchronization operation to the station according to the fifth data consistency identifier.

10. The data consistency control method according to claim 9, wherein the sending, by the center, the data synchronization operation to the station according to the fifth data consistency identifier comprises:

sending, by the center, the fifth data consistency identifier to the station;

decoding, by the station, the fifth data consistency identifier to acquire the one or more key fields of the data, and locally calling corresponding data difference from the station according to the one or more key fields of the data; and locally storing, by the center, the data difference;

acquiring all the data in the target time interval locally; and sending, by the center, a second data consistency detection command.

11. The data consistency control method according to claim 1, further comprising:

acquiring one or more service features of the one or more types of the data; and establishing one or more data calling mechanisms between the center and the station according to the one or more service features, wherein during a data calling, a corresponding data calling mechanism is determined according to the one or more service features of the data, and each of the one or more data calling mechanisms comprises a data subscription/dissemination mechanism and a data retrieval mechanism.

12. The data consistency control method according to claim 11, wherein the data subscription/dissemination mechanism comprises:

sending, by the center, a subscription command to the station; and uploading, by the station to the center, data meeting the retrieval command upon receiving the subscription command during a data processing;

and wherein the data retrieval mechanism comprises:

sending, by the center, a retrieval command, to the station; and locally inquiring and uploading, by the station to the center, data meeting the retrieval command directly upon receiving the retrieval command.

13. The data consistency control method according to claim 12, wherein in response to that the one or more types of the data called by the center is the continuous acquisition data, the discrete acquisition data, or the alarm data, the data subscription/dissemination mechanism is used; and in response to that the one or more types of the data called by the center is the statistical data or the report data, the data retrieval mechanism is used.

14. The data consistency control method according to claim 13, wherein in response to that the one or more types of the data called by the center is the continuous acquisition data or the discrete acquisition data, the subscription command comprises a data type and station identifier information; in response to that the one or more types of the data called by the center is the alarm data, the subscription command comprises an alarm data type, an alarm equipment type, and station identifier information; and in response to that the one or more types of the data called by the center is the statistical data or the report data, the retrieval command comprises a time interval and data type information.

15. The data consistency control method according to claim 14, wherein in response to that the station does not receive the subscription command in a preset time, the station stops sending data to the center.

16. The data consistency control method according to claim 1, wherein a data consistency automatic detection and a synchronization operation is performed at every preset period.

17. The data consistency control method according to claim 1, wherein a data consistency comparative detection and a synchronization operation is performed in batches according to the one or more types of the data.

18. The data consistency control method according to claim 1, wherein information of the target time interval is recorded and stored after a data consistency comparative detection and a synchronization operation is performed on all the data in the target time interval.

19. A centralized railway signal monitoring system, comprising:
at least one processor; and
a memory coupled to the at least one processor to store instructions, which when executed by the at least one processor, cause the centralized railway signal monitoring system to:
acquire, by a center of the centralized railway signal monitoring system, all data in a target time interval locally;
encode, by the center, all the acquired data according to one or more types of data to generate a first data consistency identifier;
wherein a mode of the encoding, by the center, all the acquired data according to the one or more types of the data comprises: a single data consistency identifier encoding mode and an overall data consistency identifier encoding mode taking the time interval as a unit, wherein the single data consistency identifier encoding mode is an encoding mode based on one or more key fields of the data, and each of the one or more key fields comprises a unique identifier field and an index information field; the overall data consistency identifier encoding mode is an encoding mode based on a single data consistency identifier;
send, by the center to a station, a data consistency detection command;
inquire, by the station, all the data in the target time interval locally upon receiving the data consistency detection command and encode, by the station, the data to generate a second data consistency identifier;
send, by the station to the center, the second data consistency identifier;
compare, by the center, the first data consistency identifier with the second data consistency identifier; and
finish a data consistency control in response to that the first data consistency identifier and the second data consistency identifier that are compared are consistent.

* * * * *